United States Patent
Tarcea et al.

(10) Patent No.: US 7,131,025 B2
(45) Date of Patent: Oct. 31, 2006

(54) RESOURCE ALLOCATION AWARE QUEUING OF REQUESTS FOR MEDIA RESOURCES

(75) Inventors: Glenn Tarcea, Ann Arbor, MI (US); Jeff Porter, Springboro, OH (US); Dale Miller, Lebanon, OH (US); David E. Malerba, Morrison, CO (US)

(73) Assignee: EMC Corporation, Hopkinton, MA (US)

( * ) Notice: Subject to any disclaimer, the term of this patent is extended or adjusted under 35 U.S.C. 154(b) by 457 days.

(21) Appl. No.: 10/737,170

(22) Filed: Dec. 16, 2003

(65) Prior Publication Data

US 2004/0199810 A1 Oct. 7, 2004

Related U.S. Application Data

(60) Provisional application No. 60/434,471, filed on Dec. 18, 2002.

(51) Int. Cl.
*G06F 11/00* (2006.01)
(52) U.S. Cl. .......................... 714/6; 709/226
(58) Field of Classification Search ............... 709/226; 714/6
See application file for complete search history.

(56) References Cited

U.S. PATENT DOCUMENTS

| | | | |
|---|---|---|---|
| 5,155,854 A | 10/1992 | Flynn et al. | 395/725 |
| 5,414,851 A | 5/1995 | Brice, Jr. et al. | 395/650 |
| 5,524,085 A | 6/1996 | Bellucco et al. | 364/514 |
| 6,055,646 A * | 4/2000 | Uchihori et al. | 714/6 |
| 6,141,707 A * | 10/2000 | Halligan et al. | 710/36 |
| 6,230,200 B1* | 5/2001 | Forecast et al. | 709/226 |
| 6,338,112 B1* | 1/2002 | Wipfel et al. | 710/269 |
| 6,516,423 B1* | 2/2003 | Stenlund et al. | 714/4 |
| 6,760,808 B1* | 7/2004 | Peters et al. | 711/114 |
| 6,996,614 B1* | 2/2006 | Hallinan et al. | 709/226 |
| 7,010,602 B1* | 3/2006 | Poindexter et al. | 709/226 |
| 2002/0133530 A1 | 9/2002 | Koning | 709/102 |
| 2003/0009553 A1* | 1/2003 | Benfield et al. | 709/224 |
| 2003/0204551 A1 | 10/2003 | Chen | 709/102 |
| 2004/0010592 A1* | 1/2004 | Carver et al. | 709/226 |
| 2004/0068582 A1* | 4/2004 | Anderson et al. | 709/245 |

* cited by examiner

*Primary Examiner*—Bryce P. Bonzo
*Assistant Examiner*—Michael Maskulinkski
(74) *Attorney, Agent, or Firm*—Van Pelt, Yi & James LLP (57) ABSTRACT

Resource allocation aware processing of requests for media resources is disclosed. A queue is defined. A media resource is allocated to the queue. A media resource request is associated with the queue.

22 Claims, 6 Drawing Sheets

| QUEUE | Q1 | Q2 | Q3 | Q4 | Q5 |
|---|---|---|---|---|---|
| DEVICES | 120 | 122, 124 | 130, 132 | 128 | 134 |
| ZONES | B | B | A,B | A | A |
| REQUEST CATEGORIES | USER FILES (NAS) | SOURCE CODE (B) | DATA-BASE (C) | LEGAL (A) | ACCOUNT-ING (D) |
| REQUESTS | | | | | |

RESOURCE ALLOCATION AWARE QUEUING OF REQUESTS FOR MEDIA RESOURCES

CROSS REFERENCE TO RELATED APPLICATIONS

This application claims priority to U.S. Provisional Patent Application No. 60/434,471 entitled Automated Media Management filed Dec. 18, 2002, which is incorporated herein by reference for all purposes.

Co-pending U.S. patent application Ser. No. 10/737,715 entitled Automated Media Management, filed concurrently herewith, is incorporated herein by reference for all purposes; and co-pending U.S. patent application Ser. No. 10/737,714 entitled Automated Media Library Configuration, filed concurrently herewith, is incorporated herein by reference for all purposes.

FIELD OF THE INVENTION

The present invention relates generally to removable storage media. More specifically, resource allocation aware queuing of requests for media resources is disclosed.

BACKGROUND OF THE INVENTION

Fully or partially automated media libraries, sometimes referred to as "libraries" or "robots", are available to store and manipulate removable storage media, such as tapes used to store computer data for backup or archive purposes. A typical library may be equipped with a robotic or other mechanism for manipulating the media stored therein, such as by inserting a selected volume or unit of the media (e.g., a particular tape) into a read/write device associated with the unit, e.g., a tape drive configured to write data to and/or read data from the media. In the computer network environment, for example, one or more backup applications may be used to store data from one or more computers or other devices connected to the network (sometimes referred to herein as network "nodes" or "hosts") on storage media associated with a library.

A media management application may be provided to facilitate the tracking of removable storage media resources and to coordinate the servicing of requests for removable media storage resources, such as a request by a backup application that a particular volume of media be mounted on a particular drive for a backup (or restore) operation. In some network environments, multiple competing demands for the same resource may be received by the media management application at the same time. For example a first request that a first volume be mounted on a designated media storage drive may be received and a second request that a second volume be mounted on the same drive may received while the first request is still pending. In such situations, the media management application must determine which request to service first.

One typical approach is to assign different priorities to different hosts and/or data sets having different levels of importance to network stakeholders (e.g., a commercial or other enterprise) and/or having different requirements for backup and/or restoration using removable storage media and associated storage devices. However, such a use of priorities may not be sufficient to ensure that the most important requests are serviced in a timely manner. For example, competing requests assigned the same priority may be received at the same time. Also, a storage device may be busy with a lower priority request that takes a long time to complete at a time when an urgent, higher priority request for the same device is received.

Therefore, there is a need for a way to ensure that removable storage media resources (e.g., drives) are utilized in a way that ensures that the varying removable storage media resource requirements of different hosts and/or data sets are met.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Resource allocation aware queuing of requests for media resources is disclosed. A media resource request queue is defined. One or more removable storage media resources, such as a read/write device, are associated with the queue. A request category is associated with the queue. Subsequently, removable storage media resource requests that are associated with the request category are placed in the queue and serviced by a resource associated with the queue.

Figure 1:
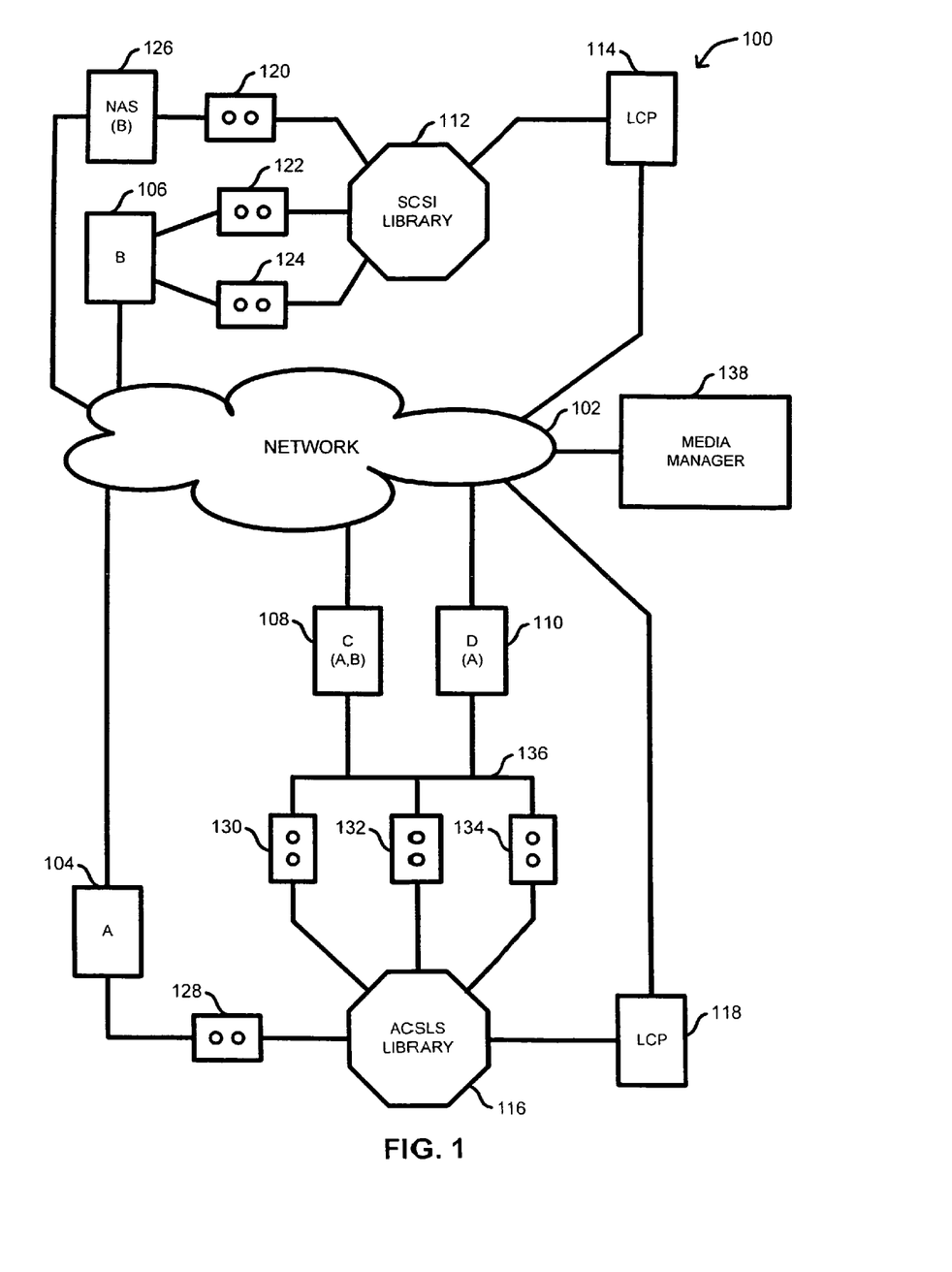
FIG. 1 is a block diagram illustrating one exemplary embodiment of a network environment and an associated media management system.

FIG. 1 is a block diagram illustrating one exemplary embodiment of a network environment and an associated media management system. The system 100 comprises a network 102, which may be a local area network (LAN) or any type of private or public network. The system 100 further comprises servers A, B, C, and D, identified by reference numerals 104, 106, 108, and 110, respectively, in FIG. 1, connected to network 102. In the example shown in FIG. 1, a first backup application, such as the NetWorker backup application available commercially from the Legato Software Division of EMC Corporation, is installed on server A (104), and a second backup application is installed on server B (106). The first and second backup applications may be the same or different products. The data on server C (108) is backed up by both the first backup application installed on server A (104) and the second backup application installed on server B (106), as is indicated in FIG. 1 by the letters "A" and "B" in parentheses below the letter "C". Such a configuration may be used, e.g., to provide two independent backups for particularly critical data. Server D (110) is backed up by the first backup application installed on server A (104). Server A may likewise comprise a body of data that is backed up by operation of the first backup application installed on server A, and server B may comprise a body of data that is backed up by operation of the second backup application installed on server B. The storage media used by the first and second backup applications installed on servers A and B, respectively, reside in two storage media libraries of different types. SCSI library 112 is a library configured to be controlled directly by a library host 114 via a small computer systems interface (SCSI) connection. Library host 114 is connected to SCSI library 112 and to network 102. ACSLS library 116 is an automated cartridge system library software-controlled library of the type available commercially from Storage Technology Corporation (StorageTek) of Louisville, Colo. An ACSLS-type library such as library 116 is controlled using a software controller provided for that purpose, as opposed to being controlled directly by the library host. Library host 118 is connected to and configured to control ACSLS library 116. Library host 118 also is connected to network 102. While examples of a SCSI and ACSLS type library are shown in FIG. 1, any number of combination of types of libraries may be used, including without limitation IBM 3494, ADIC AML, and/or any other type of library. SCSI library 112 has associated with and connected to it tape drives 120, 122, and 124. Tape drive 120 is connected to a network attached storage (NAS) device 126. The data on NAS 126 is backed up by operation of the second backup application installed on server B. NAS 126 also has a connection to network 102. ACSLS library 116 has associated with and connected to it tape drives 128, 130, 132, and 134. Tape drive 128 is connected to server A. Tape drives 130, 132, and 134 are connected to servers C (108) and D (110) via a storage area network (SAN) 136. SAN 136 makes it possible for each of servers C and D to read from or write to any one of the SAN-connected tape drives 130, 132, and 134.

A media management application is installed on a media manager 138 to coordinate operations between the first backup application running on server A and the second backup application running on server B, such as by receiving and arbitrating between potentially competing requests for resources associated with libraries 112 and 116, as well as executed such requests. For example, the media manager may receive requests from the backup applications that a particular tape residing in one of the libraries be inserted into a tape drive associated with that library. The media management application may provide other functionality, such as keeping track of tapes stored in the libraries and elsewhere. The media manager 138 has a connection to the network 102, which it uses to communicate with other nodes connected to network 102 as described more fully below. The media manager 138 may comprise a server connected to network 102.

To ensure the availability of removable storage media resources (e.g., devices, such as tape drives) to serve critical requests, such as to restore a mission critical system or particularly critical data, the techniques described herein may be used to allocate or dedicate a subset of the available removable storage media resources to a queue established to service requests associated with the critical system and/or data. Absent such an allocation, a critical request may not be serviced in an adequately timely manner. Consider an example in which the data requiring backup in the network environment 100 of FIG. 1 comprised legal department files stored on server A (104), source code stored on server B (106), a mission critical database (e.g., a sales transaction and order status database) stored on server C (108), accounting data stored on server D (110), and user files stored on NAS 126.

If due to regulatory or other legal requirements a large number of files, or a great deal of accounting data of various classes residing on server D (110) were required to be backed up onto different volumes of storage media, absent an allocation of media resources the backup application running on server A (104) might request that three different tapes be mounted on tape drives 130, 132, and 134 to back up accounting data on server D (110). If while these three backup operations were being performed the need arose to restore mission critical data to server C (108), no tape drive to which server C has a connection would be available to service the request. Under such circumstances, even if the media manager were to assign the highest priority to the request and/or otherwise ensure that the request related to restoring server C would be the next one serviced by the first tape drive to become available on SAN 136, an unacceptable amount of time might elapse before such a resource became available.

To avoid the situation described above and similar potential problems, resource allocation aware queuing of requests for media resources is disclosed. For example, in the case of the network environment 100 of FIG. 1, a queue may be defined for the purpose of servicing requests with respect to the database stored on server C. One or more of the tape drives on SAN 136 may be allocated to this queue, reserving the device(s) so allocated for the servicing of requests associated with server C. Using this approach, there is no risk that requests associated with server D, or any other host that may be on the SAN 136, may block the servicing of critical requests associated with server C.

Figure 2:
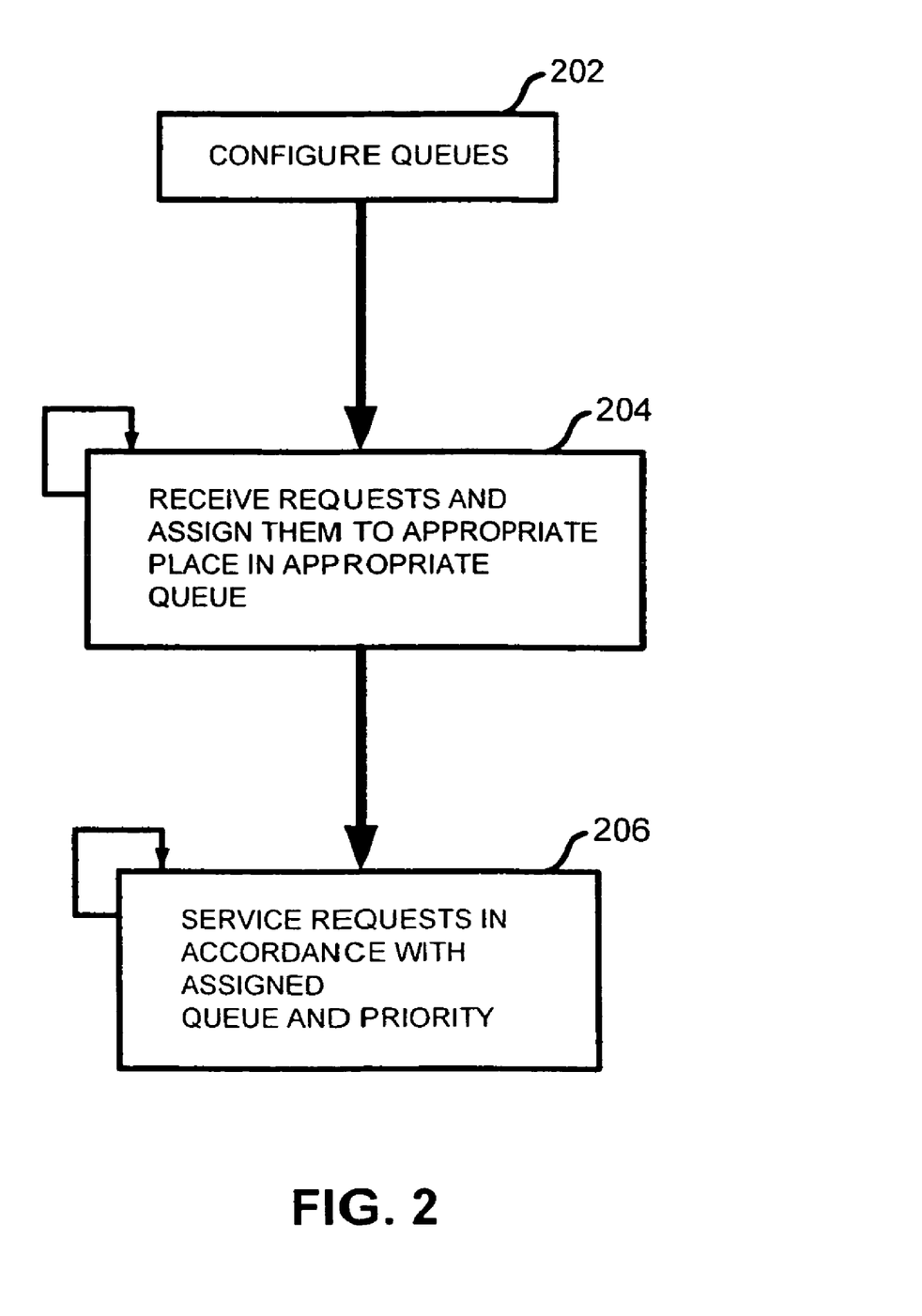
FIG. 2 is a flow chart illustrating a process used in some embodiments to provide resource allocation aware queuing of requests for media resources.

FIG. 2 is a flow chart illustrating a process used in some embodiments to provide resource allocation aware queuing of requests for media resources. In step 202, one or more queues are configured. Step 202 may comprise defining one or more queues, assigning one or more storage devices with each queue, defining one or more request categories (e.g., a category for requests associated with the database on server C), and/or assigning one or more request categories to each queue. In step 204, storage media resource requests, e.g., a request to mount a specified volume of storage media on designated device, are received (e.g., by a media management application) and assigned to an appropriate place in an appropriate queue. Step 204 is repeated as each request is received. In step 206, requests in the queue(s) are serviced in accordance with their associated queue and priority. For example, a request that based on its assigned priority, time of receipt, etc. is the request next in line to be serviced in a queue associated with a drive that just became available (e.g., because a backup, restore, or other operation for which the device previously was being used was completed) may in an iteration of step 206 be serviced by mounting the volume indicated in the request on the available drive. Step 206 is repeated as each request is serviced.

Figure 3:
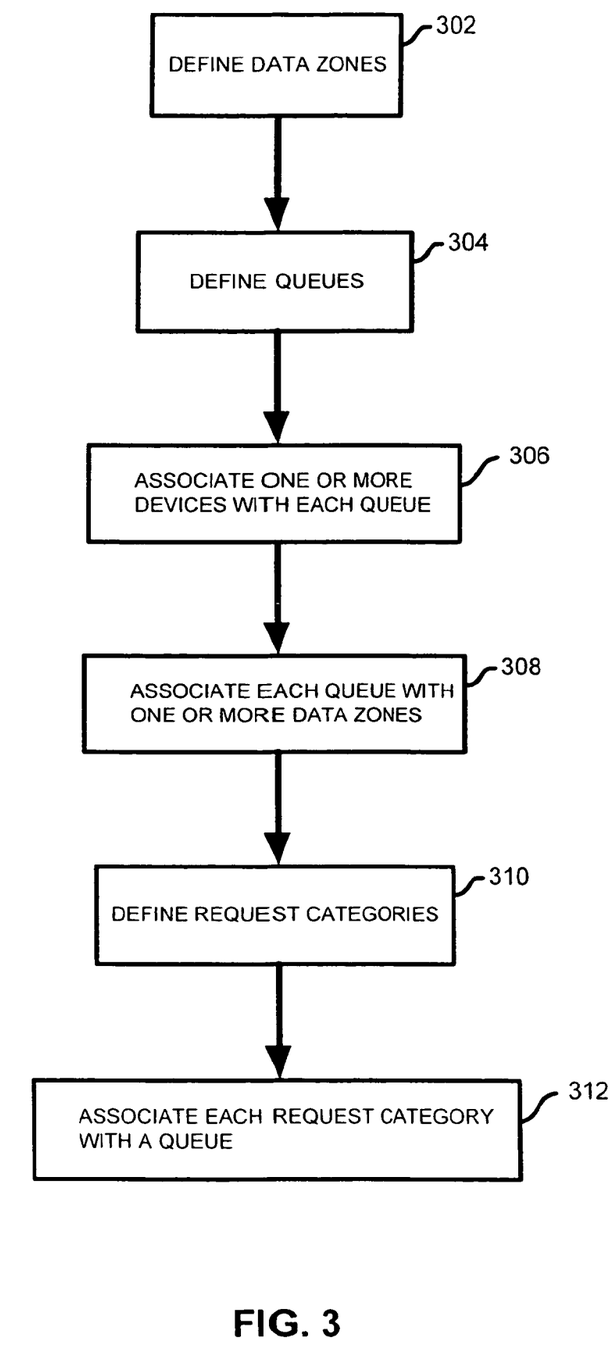
FIG. 3 is a flow chart illustrating a process used in some embodiments to configure one or more queues, as in step 202 of FIG. 2.

FIG. 3 is a flow chart illustrating a process used in some embodiments to configure one or more queues, as in step 202 of FIG. 2. In step 302, one or more data zones are defined. A data zone may comprise a set of hosts and associated data served by a particular backup application program. For example, in the network environment 100 of FIG. 1, a first data zone may be defined for the hosts associated with a first backup application running on server A (i.e., servers A, C, and D) and a second data zone may be defined for the hosts associated with a second backup application running on server B (i.e., servers B and C and NAS 126). In some embodiments, a data zone administrator may be designated and given the access required to configure queues with respect to his/her particular data zone, as described more fully below. In step 304, one or more queues are defined. Defining a queue may comprise receiving an indication from a user that a new queue should be set up and receiving from the user (or assigning) a name or other identifier for the queue. In step 306, one or more storage devices (e.g., tape drives) are associated with each queue. Step 306 may comprise receiving from a user via a user interface an indication that a designated tape drive should be associated with a particular queue. In some embodiments, each device (e.g., drive) may be assigned to only one queue. Devices not assigned to any queue are in some embodiments assigned by default to a default queue used to service requests that are not associated with any other queue. In step 308, each queue is associated with one or more data zones. Step 308 may comprise giving a data zone administrator the access required to assign request categories to a queue, as described more fully below. In step 310, one or more request categories are defined. In some embodiments, the data zone administrator defines the request categories for his/her data zone. For example, in the case of a data zone associated with a backup application that associates related resources together in pools (e.g., related volumes of removable storage media), such as the NetWorker application described above, each pool may be associated with a request category. Likewise, request categories may be defined, such as through a user interface, by defining a request category for a body of related data (e.g., accounting data, source code, user files, legal department files, etc.) and/or by defining a category by reference to a particular host (client), e.g., requests associated with server A in FIG. 1. In step 312, each request category is associated with a queue.

Figure 4:
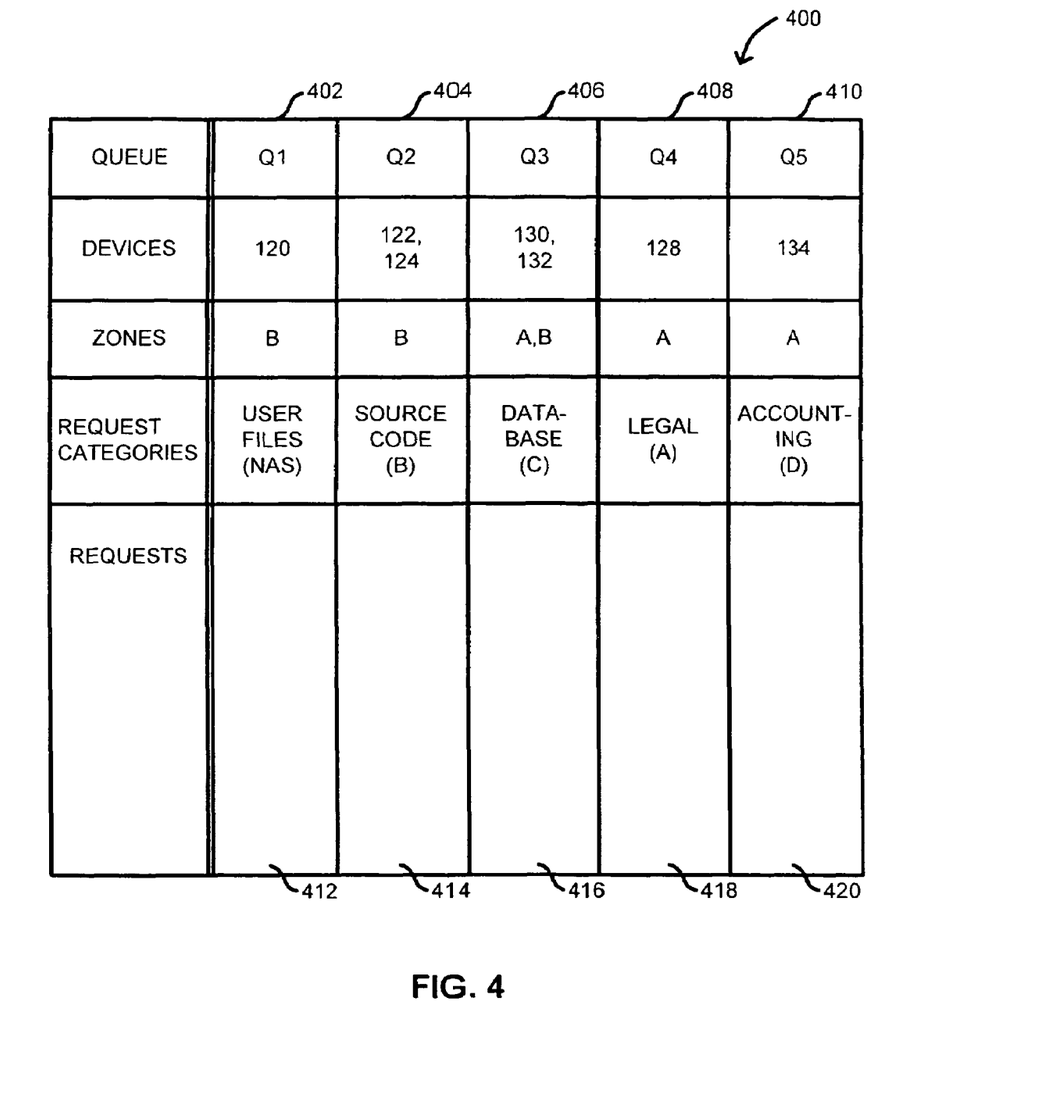
FIG. 4 illustrates a set of queues defined via the process shown in FIG. 3.

FIG. 4 illustrates a set of queues defined via the process shown in FIG. 3. The set of queues 400 comprises five queues 402, 404, 406, 408, and 410, also identified in FIG. 4 as Q1–Q5. The queues 400 are set up as shown for purposes of illustration and use the network environment 100 as shown in FIG. 1 by way of example. In the example shown, queues 406, 408, and 410 have been assigned to a data zone A and queues 402, 404, and 406 have been assigned to a data zone B. In this example, data zone A corresponds to the clients and storage nodes associated with the first backup application running on server A (104) of FIG. 1 and data zone B corresponds to the clients and storage nodes associated with the second backup application running on server B (106) of FIG. 1. Each of the queues 400 has one or more storage devices allocated to it. In this example, device 120 is assigned queue Q1 (402), devices 122 and 124 are assigned to queue Q2 (404), devices 130 and 132 are assigned to queue Q3 (406), device 128 is assigned to queue Q4 (408), and device 134 is assigned to queue Q5 (410).

Each queue is shown in FIG. 4 as having a single request category associated with it. However, in other embodiments more than one request category may be assigned to a queue. In the example shown, the request categories are based on the nature of the data that the backup applications are configured to backup/restore on each network client. For example, queue Q1 (402) has assigned to it a request category named "user files", which corresponds to the data backed up on the NAS 126. Queue Q2 (404) has assigned to it a request category named "source code", which corresponds to the data backed up on server B. Queue Q3 (406) has assigned to it a request category named "database", which corresponds to the data backed up on server C (by both the first and second backup applications, i.e., in both data zones A and B). Queue Q4 (408) has assigned to it a request category named "legal", which corresponds to the data backed up on server A. Finally, queue Q5 (410) has assigned to it a request category named "accounting", which corresponds to the data backed up on server D.

In the example shown in FIG. 4, one can see from FIG. 1 that the queues Q3 (406) and Q5 (410) operate to allocate two of the three tape drives on SAN 136 (i.e., drives 130 and 132) to supporting requests associated with the database stored on server C (108) and the third drive on SAN 136 (i.e., drive 134) to supporting requests associated with the accounting files associated with server D (110). In this way, the resources on SAN 136 can be allocated in the way deemed most appropriate by the responsible network administrators, ensuring that the resources are used and/or available as required to support the data management (e.g., backup and restore) of the enterprise or other stakeholder(s) associated with the network.

Each of the queues Q1–Q5 has associated with it a pending request area, identified in FIG. 4 as areas 412, 414, 416, 418, and 420, respectively. These areas are used as described more fully below to track pending requests associated with each queue. The queues themselves may be implemented in any number of ways known to those of ordinary skill in the art. For example, each may comprise a data structure for storing pending requests and related data (e.g., priority, place in line, order or time in which received, etc.) and logic for receiving requests, determining their relative order within the queue, and selecting/identifying from among the pending request the next request to be serviced when a resource (e.g., drive) associated with the queue becomes available.

In the example shown in FIG. 4, all of the tape drives in the network environment 100 of FIG. 1 have been assigned to a queue, and all of the requests that may be generated with respect to hosts (clients) in network environment 100 have been assigned to a request category, each of which has in turn been assigned to a queue. However, in other embodiments, a user may choose not to create a queue for each device and/or type of request, and to instead create one or more queues to handle a subset of the requests associated with the network environment, such as to ensure that the most critical requests are serviced in a timely manner. For example, referring further to FIG. 4, in some embodiments it may be sufficient or advantageous to define only queues Q3 and Q5, to allocate resources on the SAN 136 of FIG. 1. In such a case, requests not associated with a request category and/or queue will be handled by a default queue, such as a default queue for the data zone from which the request originated.

Figure 5:
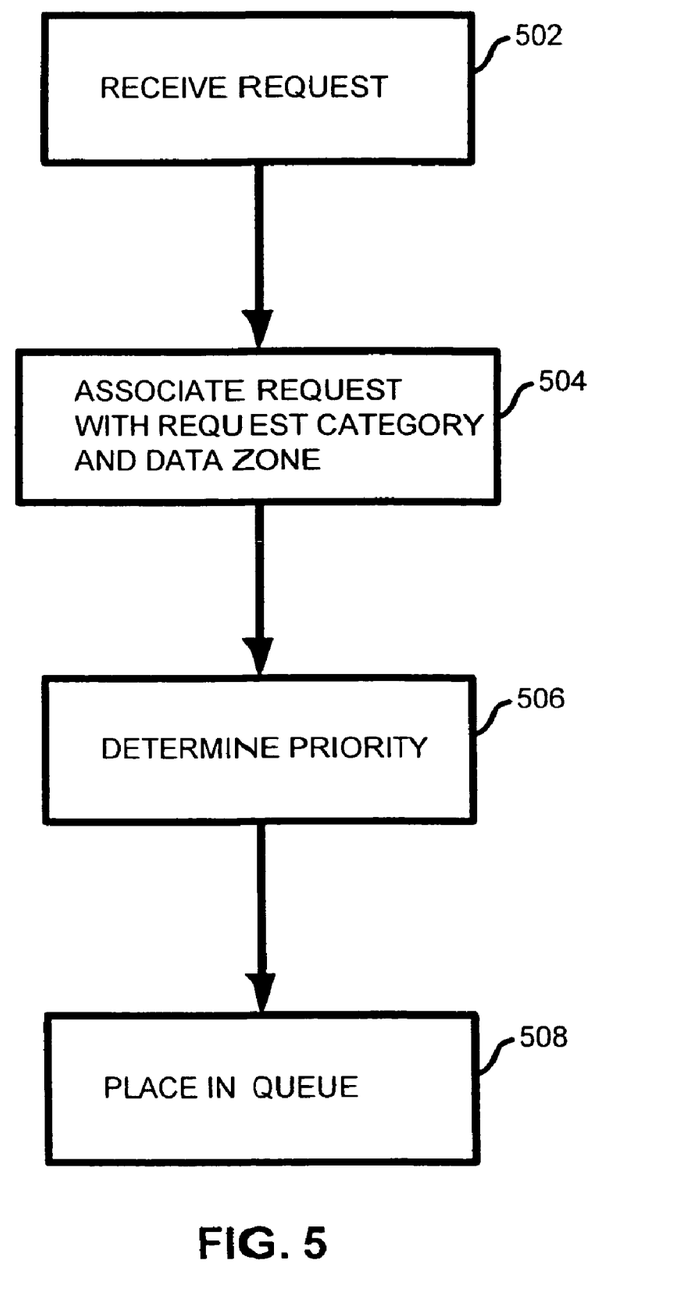
FIG. 5 is a flowchart illustrating a process used in some embodiments to receive requests and assign them to a queue, as in step 204 of FIG. 2.

FIG. 5 is a flowchart illustrating a process used in some embodiments to receive requests and assign them to a queue, as in step 204 of FIG. 2. In step 502, a request for a removable storage media resource is received. The request may comprise, for example, a request that a particular volume of storage media (e.g., a specified tape) be mounted on a particular device (e.g., tape drive). In step 504, the request is associated with a request category and a data zone. In some embodiments, the request may indicate the request category and/or data zone to which it relates. In some embodiments, the request may comprise other information that may be used to associate the request with a request category and/or data zone, such as information identifying a pool, a client (host) system, or the data or data type to which the request relates, or indicating the backup or other application that generated the request. In some embodiments, not shown in FIG. 5, if no request category is indicated (or the request category cannot be determined based on other information), the request is assigned to a default queue for the data zone to which the request relates. In step 506, the priority level of the request is determined. In some embodiments, step 506 may comprise receiving with the request an indication of the priority of the request. In some embodiments, the priority may be determined at least in part by the type of operation associated with the request (e.g., a request associated with a restore operation may have higher priority than a request associated with a backup operation). In some embodiments, the priority may be determined at least in part based on the data and/or host to which the request relates. In step 508, the request is place in the appropriate place in line in the appropriate queue. Step 508 may comprise placing the request in the queue that corresponds to the request category and data zone associated with the request, as determined in step 504. Step 508 may comprise placing the request in the queue in a place determined at least in part by the priority determined in step 506. For example, a request may be placed in the queue in a position ahead of pending requests having a lower priority and behind pending requests having higher priority. In some embodiments, requests of the same priority are handled on a first-in-first-out (FIFO) basis. In some embodiments, once a request is placed within a queue in the appropriate place a user may alter the position of the request within the queue. A user interface may be provided to facilitate such altering of the order within a queue, such as by allowing a user to click on and drag a request from a current position in the queue to a new position.

Figure 6:
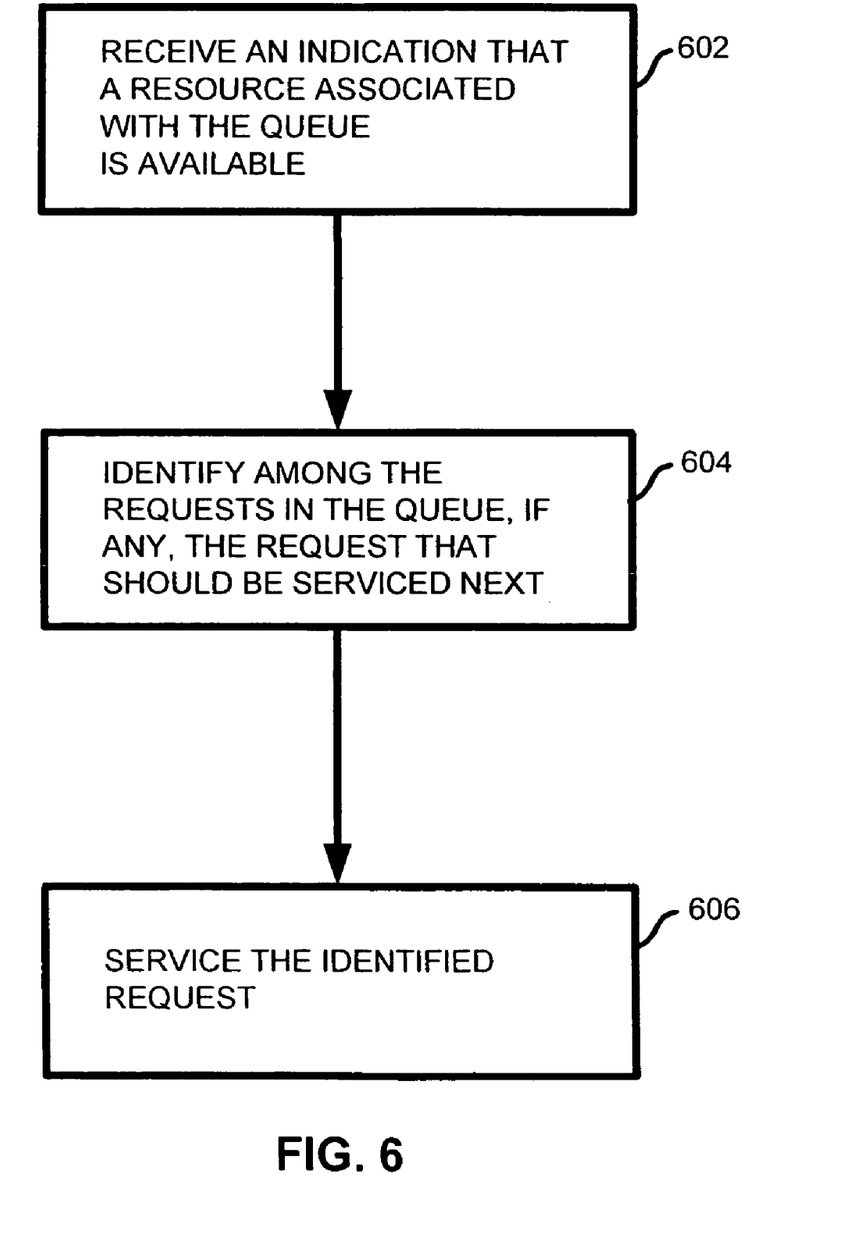
FIG. 6 is a flow chart illustrating a process used in some embodiments to service requests in accordance with their assigned queue and priority, as in step 206 of FIG. 2.

FIG. 6 is a flow chart illustrating a process used in some embodiments to service requests in accordance with their assigned queue and priority, as in step 206 of FIG. 2. In step 602, an indication is received that a resource associated with a queue is available. Such an indication may comprise, e.g., an indication from the backup application that a previously serviced request is complete. In other embodiments, the indication may comprise an indication received from the library that a tape dismount operation with respect to the drive in question has been completed. In step 604, the next request in line in the queue is identified from among the requests pending in the queue. In some embodiments, the requests are stored in the queue in the order in which they are to be serviced, based on the nature of the request and/or other priority information, as described above. In such embodiments, step 604 comprises reading from the first (i.e., next to be serviced) position in the queue information about the next request due to be serviced. In step 606, the request identified in step 604 is serviced, e.g., by causing a tape specified in the request to be mounted on a drive specified in the request (and/or a drive associated with the queue, if none is specified in the request).

Requests in a default queue may be handled similarly to requests in queues to which resources have been allocated, except that the resources (e.g., drives) available to service such requests are those to which the host associated with each respective request has a connection and that are not allocated to another queue.

Using the techniques described herein, removable media storage resources (e.g., tape drives) may be allocated to one or more queues, dedicating them to servicing requests associated with the respective queue to which each device is assigned. This provides network administrators with the ability to ensure that resources are used in an optimal manner and that resources are available in an adequately timely manner to service mission critical requests.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing requests for media resources, comprising:
    defining a queue;
    allocating a media resource to the queue; and
    associating a media resource request with the queue;
    wherein associating a media resource request with the queue comprises associating the media resource request with a data zone associated with the queue.

2. The method of claim 1, wherein associating a media resource request with the queue further comprises associating the media resource request with a request category associated with the queue.

3. The method of claim 1, further comprising
    defining a request category; and
    associating the request category with the queue;
    wherein associating a media resource request with the queue further comprises associating the media resource request with the request category.

4. The method of claim 1, wherein the media resource comprises a media storage device.

5. The method of claim 1, wherein the media resource comprises a tape drive.

6. The method of claim 1, wherein the media resource request comprises a request to mount a volume of removable storage media on the media resource.

7. The method of claim 1, further comprising receiving the media resource request from a host.

8. The method of claim 1, further comprising receiving the media resource request from a backup application.

9. The method of claim 1, wherein the media resource is allocated exclusively to the queue.

10. The method of claim 1, wherein the queue comprises a first queue, the media resource comprises a first media resource, and the media resource request comprises a first media resource request, further comprising:
    receiving a second media resource request;
    determining that the second media resource request is not associated with the first queue; and
    associating the second media resource request with a default queue.

11. The method of claim 10, further comprising associating a second media resource with the default queue.

12. The method of claim 1, further comprising assigning the media resource request a place in the queue.

13. The method of claim 12, wherein assigning the media resource request a place in the queue comprises determining whether the media resource request has a higher priority than any other media resource request currently pending in the queue.

14. The method of claim 12, wherein assigning the media resource request a place in the queue comprises placing the media resource request in line behind previously-received media resource requests pending in the queue unless the media resource request has a higher priority than one or more previously-received media resource requests pending in the queue.

15. The method of claim 12, further comprising receiving an indication that the media resource request should be moved to a different place in the queue than the place currently assigned.

16. The method of claim 1, further comprising:
receiving an indication that the media resource is available;
selecting from the queue a selected request to be serviced by the media resource; and
servicing the selected request.

17. The method of claim 1, wherein the media resource request is associated with the queue based at least in part on data included in the request.

18. The method of claim 1, wherein the media resource request is associated with a set of data and the media resource request is associated with the queue based at least in part on the set of data to which the request relates.

19. The method of claim 1, wherein the media resource request is associated with a client on which a set of data associated with the media resource request is stored and the media resource request is associated with the queue based at least in part on the client with which the media rescurce request is associated.

20. The method of claim 1, wherein the media resource request is associated with an application that generated the media resource request and the media resource request is associated with the queue based at least in part on the application which generated the media resource request.

21. A system for processing requests for media resources, comprising:
a processor configured to:
define a queue;
allocate a media resource to the queue; and
associate a media resource request with the queue; and
a memory configured to store the media resource request and other data associated with the queue;
wherein the processor is configured to associate a media resource request with the queue at least in part by associating the media resource request with a data zone associated with the queue.

22. A computer program product for processing requests for media resources, the computer program product being embodied in a computer readable medium and comprising computer instructions for:
defining a queue;
allocating a media resource to the queue; and
associating a media resource request with the queue;
wherein associating a media resource request with the queue comprises associating the media resource request with a data zone associated with the queue.

* * * * *